Figure 1:
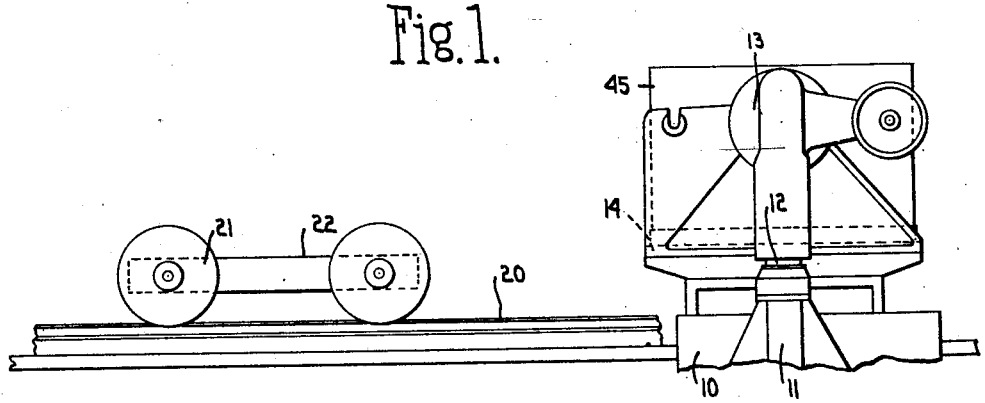

Nov. 22, 1927.

R. R. SNOW 1,650,305

METHOD AND APPARATUS FOR MOLDING ENGINE SLEEVES

Filed June 7, 1924    3 Sheets-Sheet 1

INVENTOR.
Robert R. Snow
BY
ATTORNEYS.

Nov. 22, 1927.
R. R. SNOW
1,650,305
METHOD AND APPARATUS FOR MOLDING ENGINE SLEEVES
Filed June 7, 1924   3 Sheets-Sheet 2
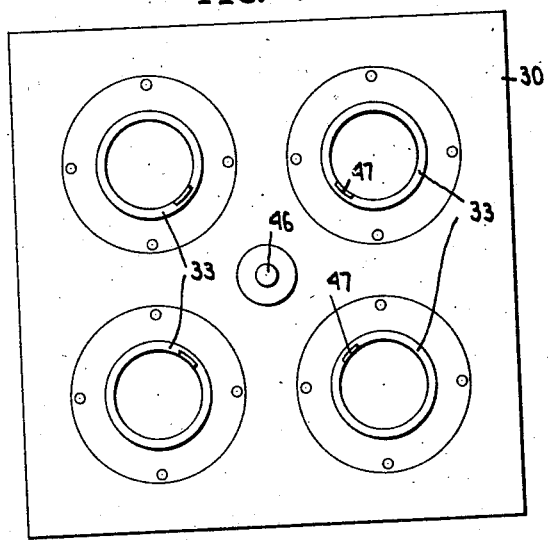
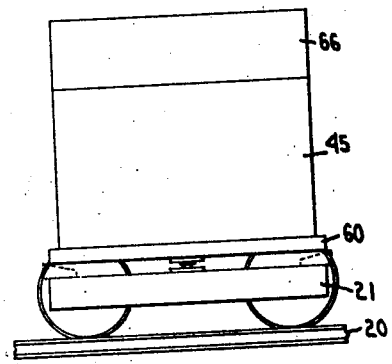
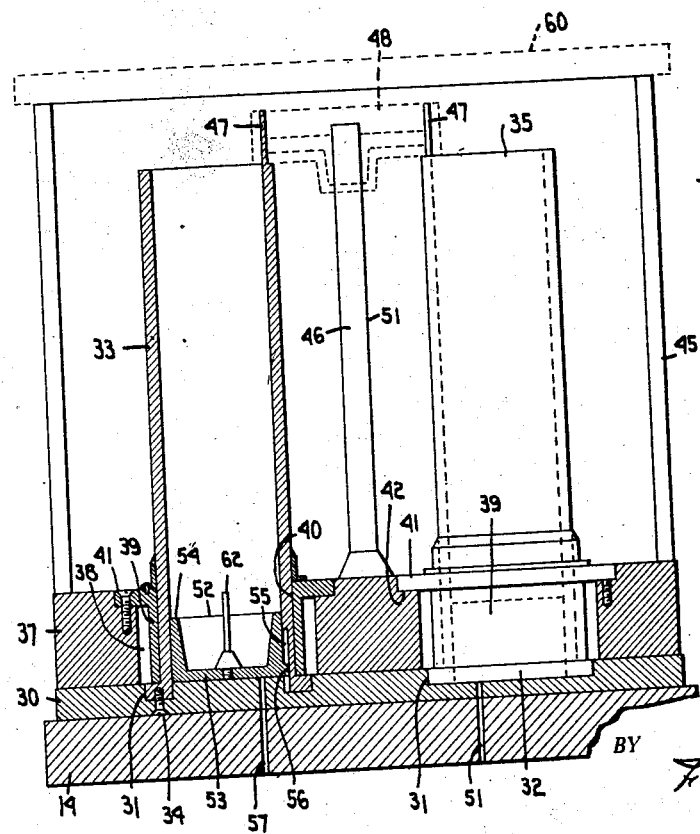
INVENTOR.
Robert R. Snow
BY
Fay, Oberlin & Fay
ATTORNEYS.

Nov. 22, 1927.

R. R. SNOW 1,650,305

METHOD AND APPARATUS FOR MOLDING ENGINE SLEEVES

Filed June 7, 1924   3 Sheets-Sheet 3

INVENTOR.
Robert R. Snow
BY
*Fay, Oberlin + Fay*
ATTORNEYS.

Patented Nov. 22, 1927.

1,650,305

UNITED STATES PATENT OFFICE.

ROBERT R. SNOW, OF CLEVELAND, OHIO, ASSIGNOR TO THE SUPERIOR FOUNDRY COMPANY, OF CLEVELAND, OHIO, A CORPORATION OF OHIO.

METHOD AND APPARATUS FOR MOLDING ENGINE SLEEVES.

Application filed June 7, 1924. Serial No. 718,431.

The present invention relating, as indicated, to a method and apparatus for molding engine sleeves is more particularly directed to improvements in the construction and use of the well known Osborne "roll-over type" of molding machines such as shown and described in Letters Patent No. 1,357,380, Nov. 2, 1920. This invention has for its object to provide in connection with a molding machine certain novel mechanism whereby the same may be utilized for mechanically molding and drawing such objects as engine sleeves which consists of long cylinders having a comparatively thin wall. Heretofore in molding engine sleeves, the drawing of the patterns has been done by hand which is quite laborious as well as expensive and difficult to produce a uniform grade of work.

The present type of machines are subjected to very hard usage in foundries and in a very short time wear develops in the bearings thereof and consequently when drawing as long a pattern as an engine sleeve, the pattern will not be drawn straight and the walls of the mold will become destroyed. This invention contemplates the provision of self adjusting means by which the various molding elements are maintained in correct alignment at all times, thus greatly improving the quality of the work.

To the accomplishment of the foregoing and related ends, said invention, then, consists of the means hereinafter fully described and particularly pointed out in the claims. The annexed drawing and the following description set forth in detail certain means and one mode of carrying out the invention, such disclosed means and mode illustrating, however, but one of various ways in which the principle of the invention may be used.

Figures 2, 3, 4:
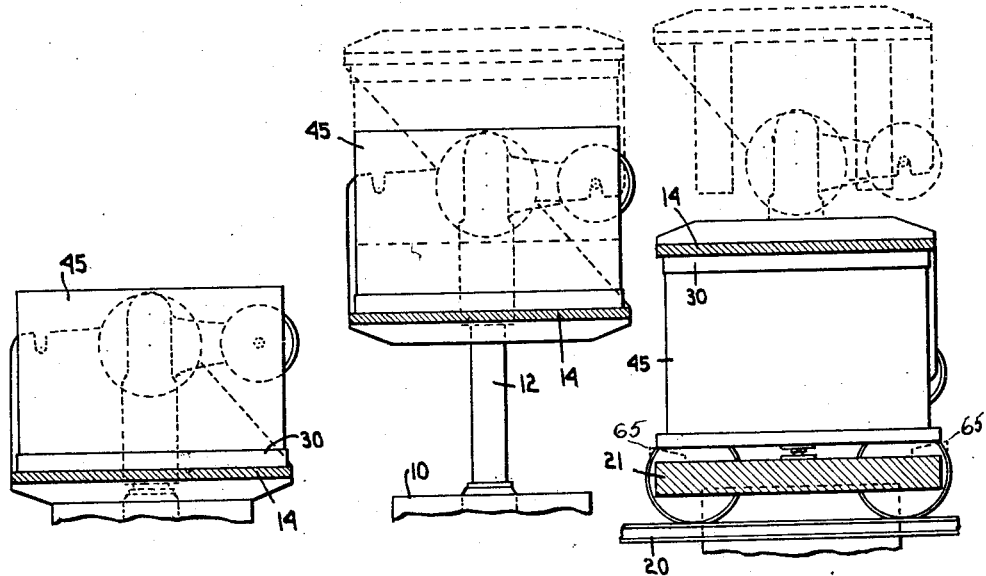
Figure 8:
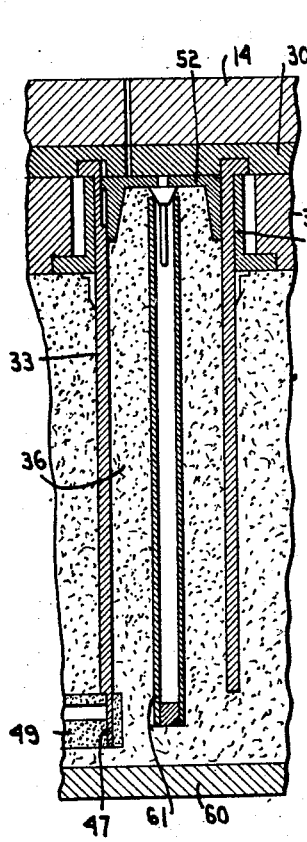
Figure 9:
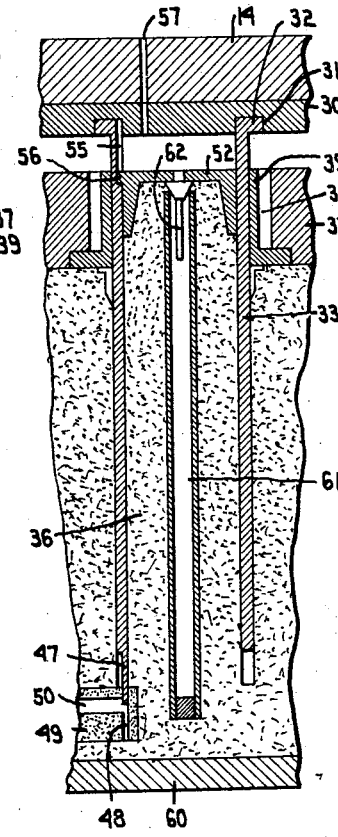
Figure 10:
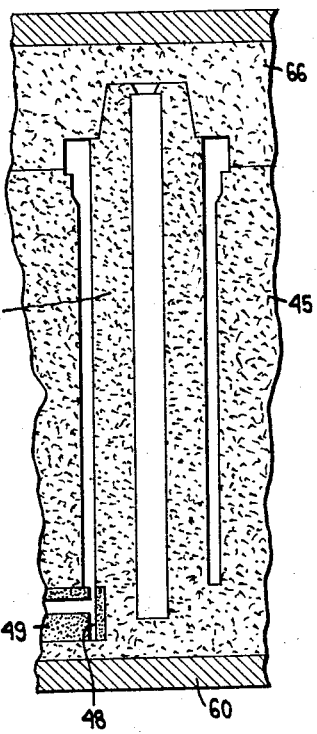
Figure 11:
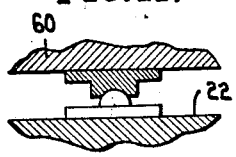

In said annexed drawing:

Fig. 1 is a side elevation of a molding machine of the roll-over type; Fig. 2 is a similar view showing the roll-over table in section and a flask in position; Fig. 3 is a view similar to Fig. 2 showing the table raised ready for the roll-over operation; Fig. 4 is a view like Fig. 3 showing the flask lowered on a truck and showing in dotted lines the drawn pattern; Fig. 5 is a view of the flask after the pattern and stripping plate have been removed and the cope placed thereon; Fig. 6 is a plan view of a pattern comprising a plurality of engine sleeves; Fig. 7 is a vertical section through the present molding mechanism as positioned on the roll-over table; Fig. 8 is an enlarged vertical sectional view through one of the sleeve patterns after the same has been packed with molding sand and in position for drawing; Fig. 9 is a similar view showing the pattern during the drawing operation; Fig. 10 is a sectional view showing the completed mold with the cope in place; and, Fig. 11 is a detail view of the adjustable means between the bottom board and truck.

The molding machine illustrated in the drawings as has been stated above, is of the well known roll-over type and only a brief description thereof will be given inasmuch as the invention may be used in connection with other machines having means for drawing the patterns. The roll-over machine comprises a bed 10, uprights 11 at each end thereof and suitable operating mechanism (not shown) which is usually carried beneath the bed 10. Mounted for vertical movement in uprights 11 are plungers 12, to the upper ends of which are pivotally secured the ends 13 of a roll-over table 14. Other mechanism, also not shown, is provided for rotating the table about its pivots when it is desired to invert the same. In use, the roll-over table is lowered so that it rests upon the base 10 during the molding of the same in the flask. Associated with the machine are tracks 20 mounted transversely thereof upon which is movable a carriage or truck 21. The tracks are arranged at a height so that the top 22 of the truck is on a level with the top of the bed 10. As seen in Fig. 4, the central portion of the bed is cut away to receive the tracks 20 so that when the roll-over table is raised, the truck may be run under such table to receive the finished flask or mold. Thus far the description relates merely to an "Osborne" roll-over molding machine and no claim is laid to the construction referred to as the invention may be utilized with many other types of molding machines.

In the present embodiment of the invention, the apparatus is illustrated as being adapted for the simultaneous molding of four engine sleeves, it being understood, however, that the exact number is immaterial and may be varied according to conditions. Upon the top of the roll-over table 14 is mounted a plate 30, commonly called the bolster plate which is suitably recessed at 31 to receive the lower ends 32 of patterns 33. Screws 34 are used to secure the patterns to the bolster plate. The patterns herein shown consist of cylinders 35 which are of considerable length and have comparatively thin walls. The difficulty of drawing patterns of the above character will be readily appreciated by one skilled in foundry art, it being a very difficult matter to produce in green sand an impression of such narrow dimension while maintaining the central core portion indicated at 36 in unbroken condition.

Mounted directly across the bolster plate 30 is a stripping plate 37 having a series of holes 38 therein through which are received the patterns 33. In the holes 38 are mounted cylindrical sleeve members 39, the inside diameter 40 of which is adapted to slidably fit the outer diameter of the patterns and said members are provided with annular outer flanges 41 at their upper ends which are secured in complementary recesses 42 in the top of the stripping plate. It is found desirable to provide the holes 38 in the stripping plate of sufficient diameter to accommodate various sizes of sleeves so that the same plate may be used for different sizes of patterns by merely changing the stripping sleeves 39. The drag portion 45 of a flask of ordinary construction is mounted on top of the plate 37 which of course surrounds the several patterns and extends above the top edges thereof, see Fig. 7.

Also mounted on the top of the stripping plate 37 is a sprue plug 46 adapted to form a suitable pouring passage 51 in the mold. The upper ends of patterns 33 are each provided with a projection 47 adapted to form a gate 48 for molten metal to each of the molded sleeve impressions in the sand. These projections also serve as guide means for a gate core 49 having a lateral passage 50 therein communicating with each such gates 48 and a central opening connecting the passage 50 with the pouring passage 51. The gate core is made separately and baked as is usual in the formation of cores.

Carried interiorly of each sleeve pattern 33 at its lower end is a cup shaped annular plug member 52, the base 53 of which normally rests on the top of the bolster plate and the circular wall 54 of which closely fits the inside diameter of the pattern. To provide certain freedom in the vertical movement between the pattern 33 and the plug 52, the purpose of which will be hereinafter more fully described, the inner wall of the pattern is recessed or grooved at 55 to receive a lateral projecting lug 56 on the lower end of the plug 52. It will be obvious that the plug may move inwardly of the pattern to the extent of groove 55. A suitable air vent 57 is provided through the roll-over table and bolster plate to prevent a vacuum between the lower end of the plug and the inner lower end of the pattern.

Preparatory to molding, the various parts described above are assembled as illustrated in Fig. 7 on the top of the roll-over table 14. In such position, the patterns project vertically and are surrounded by the flask 45. Green sand is then packed by the usual method tightly around and within the patterns until the top of the patterns is reached, at which time the gate core 49 is placed over the projections 47 and the sprue plug 46. Then the flask is filled to the top and the usual bottom board 60 clamped thereon to prevent the sand from dropping out of the flask when inverted. Due to the considerable depth of the central core portions 36 within each of the patterns, it is found desirable to adequately support such cores. For this purpose is inserted within the interior of the pattern prior to the molding of the sand, a pipe 61, having its upper end projecting beyond the top of the patterns. To insure the central location of the pipe at its lower end, an inwardly projecting pin 62 is provided on the member 53 which is adapted to enter the end of the pipe. When the mold is completed, these pipes remain in place to support the cores 36 and may be recovered after the casting operation.

When the sand has been completely molded in the flask and the bottom board clamped in place, the roll-over table is first raised and then rolled over, at which time the truck 21 is moved under the table. The table is then lowered until the bottom board rests upon the top of the truck, after which the pattern drawing operation may take place.

As is usual in apparatus of the present character, the flask may be vibrated or jarred to slightly free the patterns in the compressed sand. Figs. 8 and 9 illustrate the pattern preparatory to and during the drawing operation respectively. The rollover table is raised in a straight line away from the flask until the ends of the patterns clear the stripping plate. During the draw, the stripping plate serves to properly guide the retracting patterns and prevent the sand from breaking away around the top edges of the mold. It will be obvious that the sand core in the interior of the pattern might adhere to the sides thereof and be withdrawn or partially broken during the drawing operation which would render the mold useless. It is to prevent this disturbance of the core for which the plug 52 is provided. Referring again to Figs. 8 and 9, it will be seen that the plug which is a heavy member will not travel with the main pattern during the first part of its retractive movement but will remain in contact with the top of the core 36 to prevent it from being moved upwardly. After the pattern has started moving, there is little danger of the sand core then being disturbed and the plug may be then withdrawn with the pattern. This happens when the projection 56 engages the end of groove 55. The flask remains now with only the stripping plate resting on its top which may be removed after the truck has been run from under the roll-over table.

As has been stated hereinbefore, a molding machine is subjected to very hard usage and considerable wear develops in the operating elements in a short time. Therefore, it has been impracticable heretofore to utilize a roll-over machine for drawing patterns of such depth as that of engine sleeves because the parts became misaligned in the drawing operation and the mold destroyed. This invention provides means whereby the flask may be supported in proper alignment with the inverted roll-over table even though the same may not be in correct alignment with the top of the truck 21. Said means herein consists of a ball and socket connection interposed between the bottom of the bottom board and the top of the truck as seen on an enlarged scale in Fig. 11. It will be apparent that when the flask is lowered onto the truck before the drawing operation, the flask will automatically assume the proper alignment due to its movable mounting on the top of the truck. A number of wedges 65 may then be inserted at various points between the bottom board and the top of the truck to maintain this alignment.

After the patterns and the stripping plate have been removed, the flask is ready to receive the cope which is designated in Fig. 10 at 66. The cope may be formed in any well known manner and is of course provided with a suitable sprue, not shown, adapted to communicate with the sprue hole 51 in the drag part of the flask.

Other modes of applying the principle of my invention may be employed instead of the one explained, change being made as regards the means and the steps herein disclosed, provided those stated by any one of the following claims or their equivalents be employed.

I therefore particularly point out and distinctly claim as my invention:

1. The method of molding engine sleeves of the character described, which consists in suitably molding green sand within the interior and around the exterior of the sleeve pattern; in vertically withdrawing said pattern; in holding the sand core formed interiorly of said pattern from displacement during the first part of the drawing operation, and in removing said holding means simultaneously with said pattern during the subsequent movement of the latter.

2. The method of molding engine sleeves of the character described, which consists in vertically positioning the sleeve pattern; employing a suitable drag to surround the pattern; suitably molding green sand around and within said pattern; inverting said drag; vertically withdrawing said pattern; in holding the sand core formed interiorly of said pattern from moving upward during the first part of the drawing operation, and in removing said holding means simultaneously with said pattern during the subsequent movement of the latter.

3. The method of molding engine sleeves of the character described, which consists in vertically positioning the sleeve pattern; placing a stripping plate around the lower end of said pattern, said plate closely engaging the outer surface of said pattern; employing a suitable drag adapted to rest on said plate and encompass said pattern; suitably molding green sand around and within said pattern; inverting said drag; vertically withdrawing said pattern; and in holding the sand core formed interiorly of said pattern from moving upward during the first part of the drawing operation.

4. The method of molding engine sleeves of the character described, which consists in vertically positioning the sleeve pattern; employing a suitable drag to surround the pattern; suitably molding green sand around and within said pattern; inverting said drag; placing a supporting member under said inverted drag; vertically drawing said pattern; and in adjusting the vertical alignment between the drag and said supporting member prior to the drawing operation.

5. The method of molding engine sleeves of the character described, which consists in vertically positioning the sleeve pattern; employing a suitable drag to surround the pattern; suitably molding green sand around and within said pattern; inverting said drag; placing a supporting member under said inverted drag; vertically drawing said pattern; adjusting the vertical alignment between the drag and said supporting member prior to the drawing operation; and in holding the sand core formed interiorly of said pattern from vertical displacement during the first part of the drawing operation.

6. The method of molding engine sleeves of the character described, which consists in vertically positioning a plurality of parallel sleeve pattern upon a roll-over table; placing a stripping plate at the lower end of said patterns; employing a suitable drag adapted to rest on said plate and encompass said patterns; suitably molding green sand around and within said patterns; connecting the upper ends of the patterns by means of a gate core; inverting the roll-over table; adjustably positioning a supporting member under such table to receive the inverted drag; and in vertically withdrawing such patterns by moving the roll-over table away from said drag.

7. In apparatus of the character described; the combination of a drag; a bottom board mounted thereon; a supporting truck; and a sleeve aligning connection between the bottom core and the top of said truck.

8. In apparatus of the character described, the combination of a supporting table, a bolster plate secured thereon, a cylindrical pattern mounted on said plate; a stripping plate having an enlarged aperture therein; and a stripping sleeve removably mounted in said aperture, the inner surface of said sleeve being adapted to slidably engage the outer surface of said pattern.

9. In apparatus of the character described, the combination of a supporting table, a bolster plate secured thereon, a cylindrical pattern mounted on said plate; a stripping plate having an enlarged aperture therein; a stripping sleeve removably mounted in said aperture, the inner surface of said sleeve being adapted to slidably engage the outer surface of said pattern; and a movable plug member mounted within said pattern at its lower end.

10. In apparatus of the character described, the combination of a cylindrical pattern; a bolster plate for supporting one end of said pattern; and a movable plug member mounted within said pattern at its lower end, said plug normally lying against said bolster plate and being movable inwardly of said pattern for only a portion of its height.

11. The method of molding engine sleeves, which consists in vertically supporting the sleeve pattern; employing a suitable drag to surround the pattern; suitably molding green sand around and within said pattern and also above said pattern; and in supporting the core portion formed interiorly of said pattern from lateral displacement by forming the cope to engage around the extended core portion.

12. The method of molding engine sleeves, which consists in vertically supporting the sleeve pattern; employing a suitable drag to surround the pattern; suitably molding green sand around and within said pattern; supporting the core portion formed interiorly of said pattern from lateral displacement; vertically withdrawing said pattern; and in holding the end of said core from vertical displacement during the first part of the drawing operation by providing a weighted member adapted to rest on top of and surround a portion of the upper end of said core.

Signed by me, this 2nd day of June, 1924.

ROBERT R. SNOW.